United States Patent

[11] 3,569,808

[72] Inventor Kunio Goto
Tokyo, Japan

[21] Appl. No. 746,528
[22] Filed July 22, 1968
[45] Patented Mar. 9, 1971

[73] Assignee Victor Company of Japan, Limited
Yokohama, Japan

[32] Priority July 25, 1967
[33] Japan
[31] 42/47,397

[54] SERVO SYSTEM FOR MAGNETIC RECORDING AND REPRODUCING APPARATUS
4 Claims, 8 Drawing Figs.

[52] U.S. Cl. .......... 318/314, 318/318
[51] Int. Cl. .......... H02p 5/00
[50] Field of Search .......... 318/314, 318 (Cursory)

[56] References Cited

UNITED STATES PATENTS

| | | | |
|---|---|---|---|
| 3,270,130 | 8/1966 | Hurst et al. | 318/314 |
| 3,356,921 | 12/1967 | Bradford et al. | 318/314 |
| 3,361,949 | 1/1968 | Brown et al. | 318/314 |
| 3,174,090 | 3/1965 | Hall | 318/318 |
| 2,803,793 | 8/1957 | Wible, Jr. | 318/314 |
| 3,400,317 | 9/1968 | Thomas | 318/314 |
| 3,424,966 | 1/1969 | Webb | 318/314 |

*Primary Examiner*—Oris L. Rader
*Assistant Examiner*—K. L. Crosson
*Attorney*—Louis Bernat

ABSTRACT: This invention provides a servo system for controlling a motor driving a rotary magnetic head assembly in a magnetic recording and reproducing apparatus. The motor is driven by an output signal from an oscillator. A first phase comparator produces a first control signal responsive to the phase difference between a signal which is synchronous with the rotation of the motor and a reference signal which is derived from a signal that is to be recorded. A second phase comparator produces a second control signal responsive to the phase difference between the output of the oscillator and the reference signal. The first and second control signals are added to control the oscillating frequency and phase of the oscillator and thereby maintain a proper rotation of the motor.

INVENTOR
KUNIO GOTO

BY Louis Bernat
ATTORNEY

INVENTOR
KUNIO GOTO

BY Louis Bernat
ATTORNEY

PATENTED MAR 9 1971

3,569,808

SHEET 3 OF 3

INVENTOR

KUNIO GOTO

BY Louis Bernat

ATTORNEY

SERVO SYSTEM FOR MAGNETIC RECORDING AND REPRODUCING APPARATUS

The present invention relates to a servo system for magnetic recording and reproducing apparatus, and more particularly, to a servo control of the frequency and phase of rotation of a motor driving magnetic heads.

A motor drives rotary magnetic heads in a magnetic head assembly of the described type includes two magnetic heads, for example, for forming on a magnetic tape a plurality of tracks disposed obliquely with respect to the longitudinal axis of the tape. These tracks are used for magnetically recording and reproducing video signals, so that a vertical synchronizing signal can be recorded accurately on the end of each of said tracks.

In the video tape recorder of a two head helical scan type of system, for example, a magnetic tape is generally mounted to contact the outer circumferential surface of a guide drum. The tape travels obliquely around the guide drum for about one half its circumference, in a predetermined direction. Two magnetic heads are mounted in diametrically opposed relation to each other on the edge of a rotary member disposed in them the middle of said guide drum and rotating, say, at a rate of 30 revolutions per second. This rotary magnetic head assembly comprises two magnetic heads used for forming, on a magnetic tape, a plurality of tracks disposed obliquely along the length of the tape. In order to record and reproduce video signals, one of the magnetic heads records one field of video signal in a linear track disposed obliquely along the length of the tape, while the rotary magnetic head assembly makes one-half a revolution. The other magnetic head records the next field on the tape in a track disposed parallel to the track formed previously by the one magnetic head, while the rotary magnetic head assembly makes another one-half a revolution. The magnetic heads are switched off and on at the end of each one-half revolution of the rotary magnetic head assembly, the switching occurring during the vertical blanking period. Therefore, it is necessary to accurately record a vertical synchronizing signal on the end of each track. To attain this end, various servo systems have hitherto been adopted so that the rotary magnetic head assembly may accurately rotate without being affected by disturbances. Servo systems hitherto used have, however, been unable to achieve satisfactory results.

Accordingly, the principal object of the present invention is to provide a servo system for magnetic recording and reproducing apparatus. Here, an object is to effect servo control by means of a simple electrical circuit which is reliable in performance and precise in function.

Another object of the invention is to provide a servo system for magnetic recording and reproducing apparatus which accurately controls the frequency of rotation and the phase of a motor for driving the rotary magnetic head assembly in spite of various disturbances caused by changes in temperature or the like.

A further object of the invention is to provide a servo system for magnetic recording and reproducing apparatus which accurately controls the frequency of rotation and the phase of a motor for driving the rotary magnetic head assembly so that a vertical synchronizing signal can be recorded accurately on the end of each track on a magnetic tape.

Other objects and advantages of this invention will become apparent from consideration of the following description when taken in conjunction with the accompanying drawings, in which.

Servo systems of the prior art will first be discussed with reference to the drawings.

Figure 1:
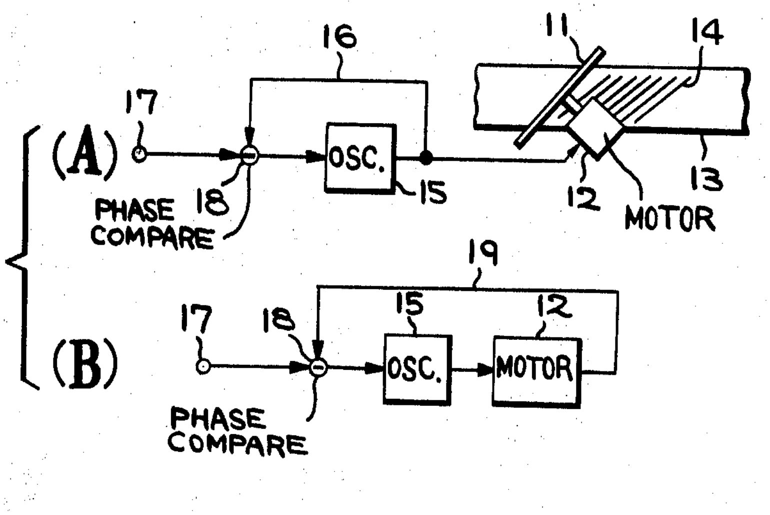
FIGS. 1A and 1B are block diagrams showing servo systems of the prior art.

In FIG. 1A which shows one example of conventional servo systems. A rotary magnetic head assembly 11 is driven by a motor 12 for forming on a magnetic tape a plurality of tracks 14 disposed obliquely along the length of a magnetic tape for magnetically recording and reproducing video signals. The motor 12 is operated by the output of an oscillator 15. A part of an output signal produced by the oscillator 15 is fed back through a loop 16 to the input of the oscillator. A comparison of phase between this fed back signal and a reference signal from a terminal is made by a phase comparator 18. The signal at terminal 17 is derived from the video signal recorded on the magnetic tape. The oscillating output frequency of the oscillator 15 is controlled by an output of the phase comparator 18 to be coincided with the frequency of the reference signal. In this case, the motor 12 should be a synchronous motor, such as a motor of the 2 phase magnet rotor type or the like. The phase of rotation is exactly proportional to the phase of the waveform of the oscillator output used for driving the motor. The opposite ends of the tracks formed on the magnetic tape, by the magnetic heads rotated by the motor, may be arranged in a predetermined manner as one magnetic head is switched to the other magnetic head.

A servo system of the prior art shown in FIG. 1B supplies, from a loop 19 to the phase comparator 18, a signal which is synchronous with the rotation of the motor 12. The method for obtaining this signal is well known and, for example, disclosed in the specification of U.S. Pat. No. 3,293,359 at Col. 3, lines 49–52. The phase comparators 18 makes a comparison of phase between this signal and a reference signal from the terminal 17. The oscillating frequency of the oscillator 15 is controlled by an output signal of the phase comparator to be coincided with the frequency of the reference signal. In this case, the motor 12 need not necessarily be a synchronous motor.

A number of different factors are responsible for variations in opposite ends of tracks recorded on a magnetic tape, the variations being caused by switching from one magnetic head to the other magnetic head, in the video tape recorder. Among other things, these factors include the following:

a. Variations in the load applied to the motor used for driving the rotary magnetic heads;
b. Variations in the frequency of the reference signal; and
c. Variations in the center oscillating frequency.

From the point of views of a servo system designer, the factor (a) causes a phase disturbance while the factors (b) and (c) give rise to a frequency disturbance. These disturbances are generally caused by variations in temperature and are principally classified as very slow disturbances.

In the conventional servo system shown in FIG. 1A, the absence of a feedback from the motor 12 to the phase comparator 18 causes disturbances in those elements of this system which are disposed after the oscillator 15. These disturbances are beyond the control of this system. When a phase disturbance is caused by the factor (a), there is a variation in opposite ends of the tracks formed on the magnetic tape by switching from one magnetic head to the other magnetic head. On the other hand, the servo system of FIG. 1B provides for a feedback loop 19 from the motor 12 so that the system is impervious to the disturbance caused by the factor (a).

It will thus be appreciated that conventional servo systems shown in FIGS. 1A and 1B effected a so-called integral control. The phase of a detected signal is compared with the phase of a reference signal to produce an error signal for controlling the oscillating frequency. It should be noted that these systems are capable of controlling a phase disturbance occurring in the loop. In the case of a frequency disturbance, the error cannot be reduced to zero and an offset is produced, making it impossible to control a frequency disturbance. Accordingly, the aforementioned prior art servo systems have a disadvantage in that a variation in phase is caused by the disturbance of the factors (b) and (C). Accordingly a variation is caused in opposite ends of the tracks formed on the magnetic tape by switching from one magnetic head to the other magnetic head. The present invention obviates this disadvantage of the conventional servo systems. The servo system provided by this invention is immune to disturbances caused by all the factors (a), (b) and (c) described above.

The servo system embodying the present invention will now be described with reference to the accompanying drawings.

Figure 2:
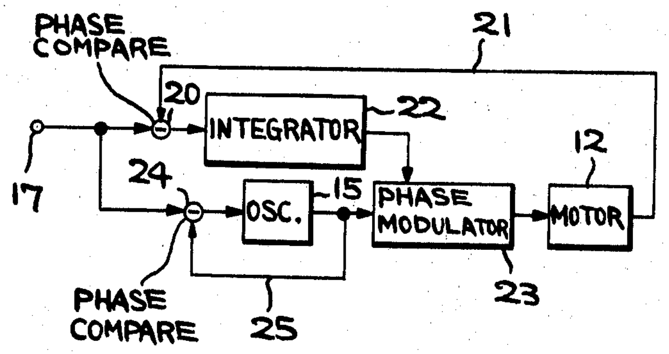
FIG. 2 is a block diagram showing one embodiment of the servo system embodying the present invention.

FIG. 2 is a block diagram of one embodiment of the servo system embodying the present invention. In FIG. 2, a first phase comparator 20 compares the phase between a signal, such as a pulse produced by a tone wheel, or the like, mounted on the shaft of the motor 12 with a reference signal from the terminal 17, which is derived from the video signal. The tone wheel pulse is supplied through a loop 21, and is synchronous with the rotation of the motor 12. An integrator 22 integrates an error signal received from the first phase comparator 20 to generate an intermediate integral signal and supply same to a phase modulator 23.

On the other hand, a part of an output signal of the oscillator 15 is fed back through a loop 25 to a second comparator 24. The second phase comparator 24 makes a comparison of phase between this fed back signal and a reference signal from the terminal 17, which is associated with the video signal. The oscillating frequency of the oscillator 15 is controlled by an output of the second phase comparator 24 to be coincided with the frequency of the reference signal. An oscillatory output signal of the oscillator 15 thus locked is supplied to the phase modulator 23 where its phase is modulated by the intermediate integral signal from the integrator 22.

If the motor 12 is a synchronous motor, the frequency of rotation of the motor 12 can be made to agree with the frequency of the reference signal supplied through the loop 25, thus permitting a control so as to cope with a phase disturbance. Also, integral control can be effected through the loop 21, so that a phase disturbance can be overcome. From the foregoing, it will be appreciated that the embodiment of the present invention described hereinabove permits a control so as to cope with both frequency disturbances and phase disturbances. Moreover, the system is impervious to any of the aforementioned factors (a), (b) and (c).

Figure 3:
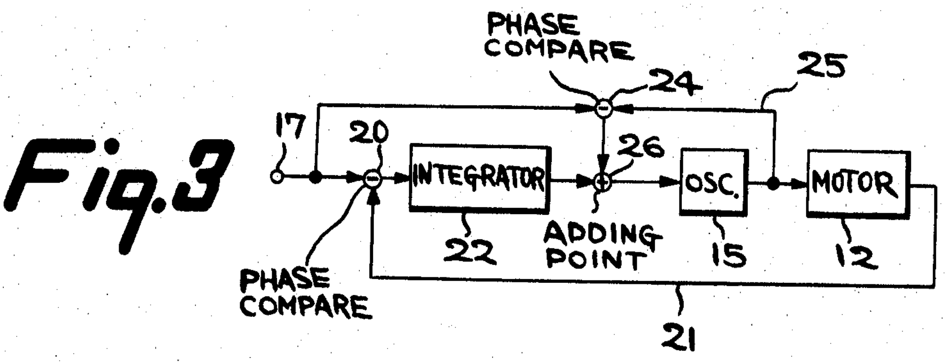
FIG. 3 is a block diagram showing a second embodiment of the servo system embodying the present invention.

FIG. 3 is a block diagram showing a second embodiment of the servo system embodying the present invention. This embodiment is a simplified form of the first embodiment and does away with the phase modulator 23. An output signal of the integrator 22 is added to an output signal of the second phase comparator 24 at an adding point 26 and the composite signal is supplied to the oscillator 15. By this arrangement, the oscillating frequency of the oscillator 15 can be controlled to be coincident with the frequency of a reference signal and its phase can be controlled by the resulting composite signal. The phase comparators 20 and 24 function in the same manner as in the first embodiment.

Application of the servo system shown in FIG. 3 to the magnetic head servo system of the video tape recorder makes it imperative to realize the following points:

1. In the video tape recorder, the phase drift is preferably above 1 to 3 degrees in the phase of the rotation of the motor. The signal detected in connection with the rotation of the motor 12 is generally in the form of a pulse which is detected once or twice during one revolution of the motor. Therefore, in many cases, it is necessary to use highly sensitive phase comparators.
2. The integrator is required to function with respect to a DC input as well, so that a DC motor is suitable for the purpose. More specifically, the integrator consists of a variable resistor having its rotary sliding member connected to the rotary shaft of the DC motor. A DC voltage of $\pm$ 12 volts is applied to the two terminals of the resistor, and a constant resistance prevails between the two terminals. An integrated output signal is taken out from the terminal of the sliding member. It is required, however, that care should be taken to leave the precision of control below a necessary level and thereby provide precision of an insensitive zone which does not function when an initial input is applied to the motor.

Figures 4A, 4B, 5:
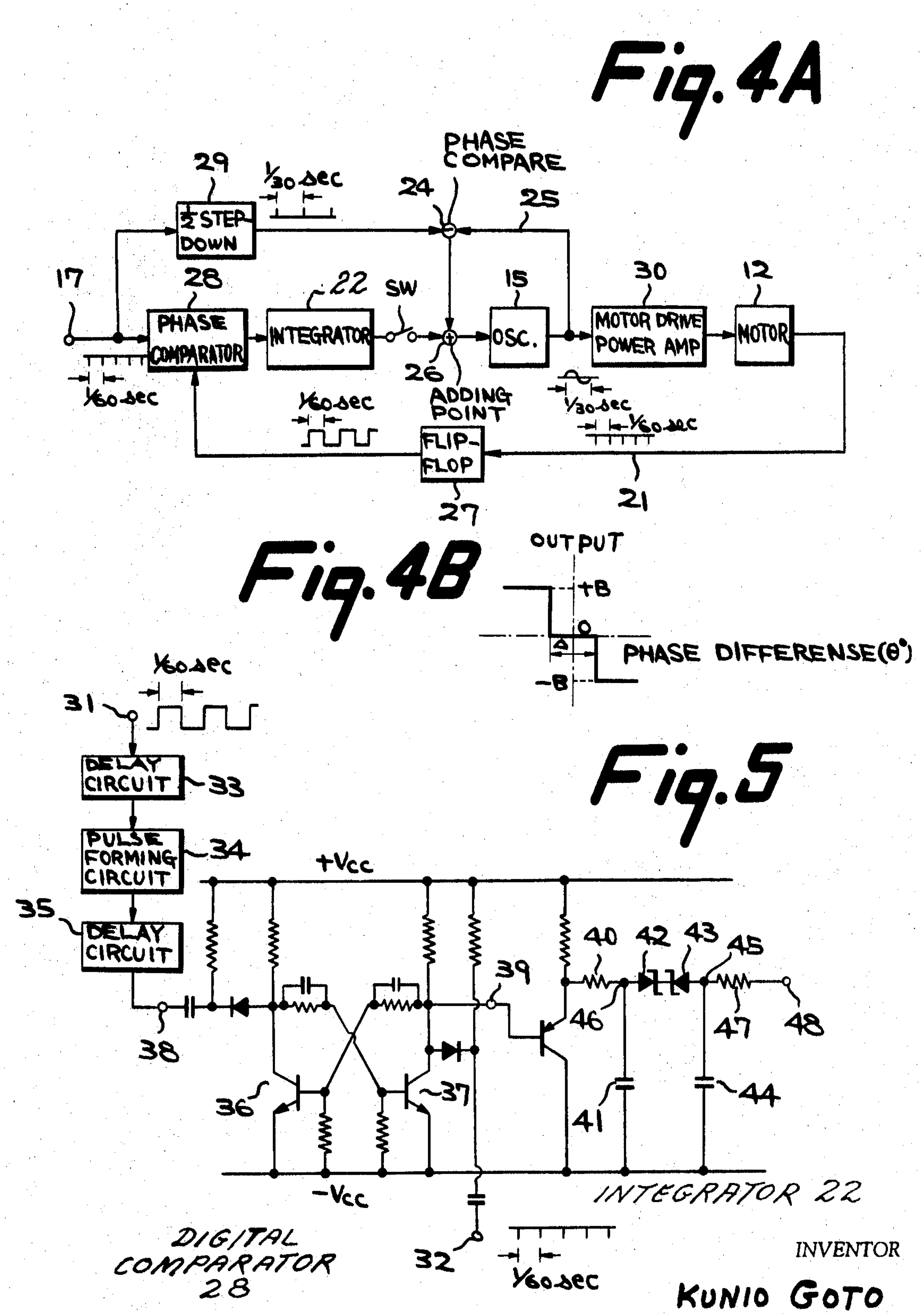
FIGS. 4A and 4B are a block diagram and a graph showing a third embodiment of the servo system according to this invention and a view in explanation of essential portions thereof respectively.
FIG. 5 is a circuit diagram showing the circuits of essential portions of the third embodiment shown in FIG. 4A and FIGS. 6A to 6D and FIGS. 7A to 7C show various waveforms of signals at various points of the circuit shown in FIG. 5.

The embodiment illustrated in FIGS. 4A and 4B satisfies the requirements set forth in points (1) and (2) above. The servo system of FIG. 4A et sequa. which is reliable in performance and high in precision of function. It does not rely on the mechanism of a DC motor or the like for the performance of the integrator 22 function. The integrator 22 used in this embodiment consists entirely of an electronic circuit.

In the third embodiment of the invention, a signal of 60 Hz. (in a synchronous state) is generated in conformity with the rotation of the motor 12 by a tone wheel. This signal is transmitted over a wire 21 to a flip-flop circuit. The flip-flop circuit is energized at particular points on the up-ramp and down-ramp sides of the signal which is converted to a symmetrical rectangular wave of 30 Hz. and then supplied to a digital phase comparator 28.

On the other hand, a reference signal from the terminal 17 is a negative pulse of 60 Hz. and is also supplied to the digital phase comparator 28. The digital phase comparator 28 produces, as shown in FIG. 4B, output signals which are in the form of digits which vary stepwise (+B, 0, −B) in accordance with a phase difference between the phase of rotation of the motor, that is the signal generated by the tone wheel and the phase of the reference signal. When the absolute value of the phase difference $\Theta_0$ is smaller than the insensitive zone $\Delta$ of the phase comparator 28, an output of the phase comparator 28 is zero. When the absolute value is larger than the insensitive zone $\Delta$, an output of the phase comparator is either +B or −B.

The output of the phase comparator 28 is integrated by the integrator 22 consisting entirely of an electronic circuit. This output signal is converted to an integrated intermediate signal whose quantity of change is in direct proportion to time. The integrated intermediate signal is applied to the adding point 26 through a switch SW. The reference signal of 60 Hz. from the terminal 17 is converted to a signal of 30 Hz. by a one-half stepdown frequency divider 29 which reduces the frequency of the reference signal by half. This 30 Hz. signal is then supplied, together with a signal from the oscillator 15, to the phase comparator 24. There its phase is compared with the phase of the signal sent from the oscillator 15 through the loop 25. An output signal, corresponding to a difference in phase is applied to the adding point 26 so as to control the frequency of the oscillator 15 to coincide with the frequency of the reference signal. The switch SW is open when the motor 12 is not operating in the normal speed. In that condition, only the system of loop 25 is in operation..

Assuming that the motor 12 is a synchronous motor whose phase of rotation is primarily determined by a phase of the voltage which drives same, it will be possible to set the phase of rotation of the motor substantially at a predetermined phase responsive to only the operation of the system of loop 25. In other words, the motor 12 has only to be mounted in such a position that opposite ends of tracks formed on a magnetic tape are disposed in a vertical blanking period. The recording of these blanking signals is effected by switching from one magnetic head to the other magnetic head. When the motor 12 is brought to a synchronous state, the switch SW is closed, and the operation of the system of loop 21 is initiated. Accordingly, the phase of the oscillator 15 is placed under the control of signals in loop 21 until the phase difference $\Theta_0$ is reduced below a predetermined phase difference level which corresponds to the insensitive zone $\Delta$. Thus, precision of control depends on the size of the insensitive zone $\Delta$. A motor drive power amplifier 30 provides the power for driving the motor 12.

Figure 6:
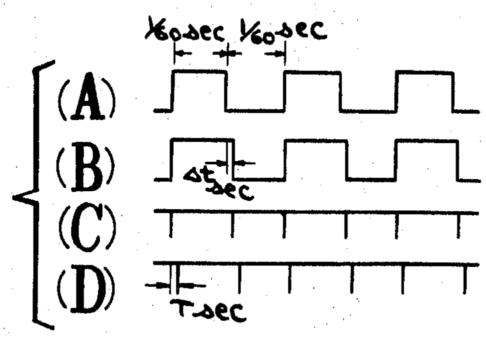

FIG. 5 shows an electrical circuit of the digital phase comparator 28 and integrator 22 of the servo system shown in FIG. 4A. A tone wheel pulse, for example, which is synchronous with the rotation of the motor 12, is supplied to the flip-flop circuit 27 shown in FIG. 4A and converted to a symmetrical rectangular pulse of 30 Hz. , as shown in FIG. 6A. This symmetrical rectangular pulse is supplied to a terminal 31 shown in FIG. 5, and a reference signal of 60 Hz. is supplied to a terminal 32. The symmetrical rectangular pulse of 30 Hz. supplied to the terminal 31 is formed, by a delay circuit 33 which causes a delay of the down-ramp side of the rectangular wave. A result is a rectangular pulse having an irregular time interval $\Delta t$ sec which repeats a cycle of $1/60 + \Delta t$ sec and $1/60 - \Delta t$ sec. This rectangular pulse is then supplied to a pulse forming circuit 34 and formed into a pulse shown in FIG. 6C. This pulse is, in turn, formed, by a delay circuit 35, into a delayed pulse which is delayed, as shown in FIG. 6D, by a time $T$ sec. The delayed pulse is applied to an input terminal 38 of a flip-flop circuit consisting of a pair of transistors 36 and 37. A signal for indicating the order of precedence of the delayed pulse appears at the collector electrode of the transistor 37. However, the reference signal pulse is applied to the terminal 32. Therefore, these two signals are combined into a new signal produced at the collector of the transistor 37.

Figure 7:
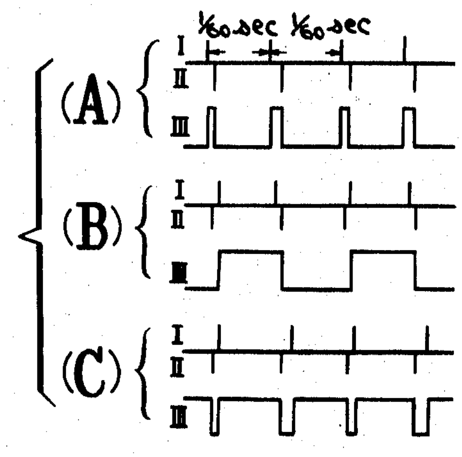

FIGS. 7A to 7C show waveforms of voltage of an output signal III produced at an output terminal 39 of the flip-flop circuit in accordance with the order of precedence of the input pulses I and II, appearing at the input terminals 38 and 32 respectively. The waveform of FIG. 7A represents a relation between the pulses in which the reference signal pulse II appearing at the terminal 32 is preceded by the delayed pulse I applied at the input terminal 38. The waveform of FIG. 7B represents a relation between the pulses in which the reference signal pulse II and the delayed pulse I alternately precede one another. There is a difference in arrival time which is within $\Delta t$ sec. The waveform of FIG. 7C represents a relation between the pulses in which the reference signal pulse II precedes the delayed pulse I. The shape of output signal III produced at the output terminal 39 varies depending on circumstances. When this signal is passed through a low pass filter circuit consisting of a resistor 40 and capacitor 41, only the DC component is taken out. A predetermined negative voltage can be produced when the waveform of the output voltage signal is as shown in FIG. 7A. A zero voltage can be produced when the waveform is as shown in FIG. 7B; and a predetermined positive voltage can be produced when the waveform is as shown in FIG. 7C.

A pair of Zener diodes 42 and 43 and a capacitor 44 make up an integrator having a long holding time. In this embodiment, a power source voltage $Vcc$ is set at 12 volts, and the Zener voltage of Zener diodes 42 and 43 at 6 volts. The maximum value of a correction voltage appearing at a point 45 is $\pm 3$ volts. Thus, the potential at a point 46 has only to be $\pm 3 + \pm 6 = \pm 9$ volts if the pair of diodes 42 and 43 is to be switched ON. Since the potential at the point 46 is $\pm 12$ volts in the states shown in FIGS. 7A and 7C, the pair of diodes 42 and 43 switched ON.

With the diodes 42 and 43 being turned ON, a capacitor 44 is charged through the resistor 40. Since the capacitor 44 has a larger capacity than the capacitor 41, charging takes place slowly. When the loop between the motor 12 and the flip-flop circuit attains equilibrium, the potential of the point 46 becomes zero. At this time, the potential of the point 45 is reduced below $\pm 3$ volts, so that the diodes 42 and 43 are switched OFF. Accordingly, the potential of the point 45 can be held stable during a long period of time if a resistor 47 has a value which is sufficiently larger than the value of resistor 40.

Since the holding time is limited, hunting may develop near the equilibrium point. However, the cycle of the hunting can be made longer and its amplitude can be made smaller by selecting suitable elements, such as resistors 40 and 47 and capacitors 41 and 44, so that the servo system does not begin hunting.

While the invention has been shown and described with reference to preferred embodiments thereof, it is to be understood that the invention is not limited to the particular form of the embodiments and that many changes and modifications may be made therein without departing from the scope and spirit of the invention.

I claim:

1. A servo system for a magnetic recording and reproducing apparatus comprising a rotating magnetic head assembly, a synchronous motor for driving said head assembly, oscillator means for generating a drive voltage which drives said motor, means for supplying a reference signal, synchronous signal means for generating a signal which is synchronous with the rotation of the motor, first phase comparator means for producing a first control signal responsive to the phase difference between the output of said synchronous signal means and the reference signal, second phase comparator means for producing a second control signal responsive to the phase difference between the drive voltage and the reference signal, adding means for adding said first and said second control signals, and means for controlling the frequency and phase of the drive voltage responsive to the output signal of said adding means.

2. A servo system for a magnetic recording and reproducing apparatus comprising a rotational magnetic head assembly, a synchronous motor for driving said head assembly, oscillator means for generating a drive voltage which drives said motor, means for supplying a reference signal, synchronous signal means for generating a signal which is synchronous with the rotation of the motor, first phase comparator means for producing an output signal responsive to the phase difference between the output of said synchronous signal means and the reference signal, means including a low-pass filter for integrating the output signal of said first phase comparator means, second phase comparator means for producing a control signal responsive to the phase difference between the drive voltage and the reference signal, adding means for adding the output of said low-pass filter means to said control signal, and means for controlling the frequency and phase of the drive voltage responsive to the output signal of said adding means.

3. A servo system for a magnetic recording and reproducing apparatus comprising a rotational magnetic head assembly, a synchronous motor for driving said head assembly, oscillator means for generating a drive voltage which drives said motor, means for supplying a reference signal, synchronous signal means for generating a signal which is synchronous with the rotation of the motor, first phase comparator means for producing an output signal responsive to the phase difference between the output of said synchronous signal means and the reference signal, integrator means for integrating said output signal of the phase comparator means and producing a first control signal in the form of a digital signal responsive to the level of the integrated signal, second phase comparator means for producing a second control signal responsive to the phase difference between the drive voltage and the reference signal, adding means for adding said first and said second control signals, and means for controlling the frequency and phase of the drive voltage responsive to the output signal of said adding means.

4. a servo system for a magnetic recording and reproducing apparatus comprising a rotational magnetic head assembly, a synchronous motor for driving said head assembly, oscillator means for generating a drive voltage which drives said motor, means for supplying a reference signal, synchronous signal generating means for generating a signal which is synchronous with the rotation of the motor, means comprising a first flip-flop circuit for generating a symmetrical rectangular waveform signal responsive to the signal of said synchronous signal generating means, means comprising a first delay circuit for delaying the trailing edge of the symmetrical rectangular waveform signal. means comprising a pulse forming circuit for differentiating the output signal of said first delay circuit means to produce a pulse signal, means comprising a second delay circuit for producing a delayed pulse signal which is delayed for a predetermined time interval after said pulse signal, means comprising a second flip-flop circuit which is driven to its set state responsive to said delayed pulse and to its reset state responsive to said reference signal, integrator means responsive to the level of the output signal of the second flip-flop circuit means for integrating the output signal of the second flip-flop circuit means to produce a first control signal in the form of a digital signal, means comprising a phase comparator circuit for producing a second control signal responsive to the phase difference between said drive voltage and the reference signal, adding means for adding said first control and said second control signals, and means responsive to the output signal of said adding means for controlling the frequency and phase of said drive voltage.